(12) United States Patent
Young

(10) Patent No.: US 6,415,347 B1
(45) Date of Patent: Jul. 2, 2002

(54) HARDWARE ATTENTION MANAGEMENT CIRCUIT AND METHOD FOR PARALLEL SCSI HOST ADAPTERS

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/344,291

(22) Filed: Jun. 30, 1999

(51) Int. Cl.⁷ .............................................. G06F 13/00
(52) U.S. Cl. ...................................... 710/305; 710/240
(58) Field of Search ................. 710/113–125, 240–244, 710/305, 309

(56) References Cited

U.S. PATENT DOCUMENTS

| | | | |
|---|---|---|---|
| 5,544,332 A | * | 8/1996 | Chen |
| 5,659,690 A | * | 8/1997 | Stuber et al. |
| 5,701,427 A | * | 12/1997 | Lathrop |
| 5,838,950 A | * | 11/1998 | Young et al. |
| 6,108,741 A | * | 8/2000 | MacLaren et al. |
| 6,233,653 B1 | * | 5/2001 | Abe et al. |
| 6,240,101 B1 | * | 5/2001 | Co et al. |

* cited by examiner

Primary Examiner—Paul R. Myers
(74) Attorney, Agent, or Firm—Gunnison, McKay & Hodgson, L.L.P.; Forrest Gunnison (57) ABSTRACT

In a parallel SCSI host adapter integrated circuit, a hardware circuit includes a SCSI bus request terminal, a SCSI bus attention terminal, and an automatic SCSI bus attention management circuit. The automatic SCSI bus attention circuit includes an automatic SCSI bus attention assertion hardware circuit coupled to the SCSI bus attention terminal and an automatic SCSI bus attention de-assertion hardware circuit coupled to the SCSI bus attention terminal and to the SCSI bus request terminal. Upon pending initiation of a selection phase, the automatic SCSI bus attention assertion circuit asserts an active signal on the SCSI bus attention terminal. Following assertion of the active signal on the SCSI bus attention terminal, the automatic SCSI bus attention de-assertion hardware circuit counts the number of active SCSI bus request signals received from the SCSI bus request terminal. Upon the automatic SCSI bus attention management circuit receiving a terminal count of active request signals from the SCSI bus request terminal, the automatic SCSI bus attention hardware circuit automatically de-asserts the active signal on the SCSI bus attention terminal.

20 Claims, 5 Drawing Sheets

HARDWARE ATTENTION MANAGEMENT CIRCUIT AND METHOD FOR PARALLEL SCSI HOST ADAPTERS

BACKGROUND OF THE INVENTION

1. Field of the Invention

This invention relates generally to data transfers over a SCSI bus, and in particular to generation of control signals on a SCSI bus.

2. Description of Related Art

Prior single chip parallel SCSI host adapters have included a plurality of modules and an on-chip processor that controlled operation of the modules. For example, see U.S. Pat. No. 5,659,690, entitled "Programmably Configurable Host Adapter Integrated Circuit Including a RISC Processor," issued on Aug. 19, 1997 to Stuber et al., which is incorporated herein by reference.

A typical parallel SCSI host adapter 100 included a SCSI module 130 (FIG. 1), a sequencer 120, a data FIFO memory circuit 160, a memory 140, and a host interface module 110 that were interconnected by an internal chip I/O bus CIOBUS, which was used for control of host adapter integrated circuit 100 both by a host microprocessor 170 through a host adapter driver 165 and by sequencer 120. The combination of host adapter driver 165, sequencer 120, and SCSI module 130 were used for controlling both synchronous and asynchronous transfers over SCSI bus 150.

Figure 1:
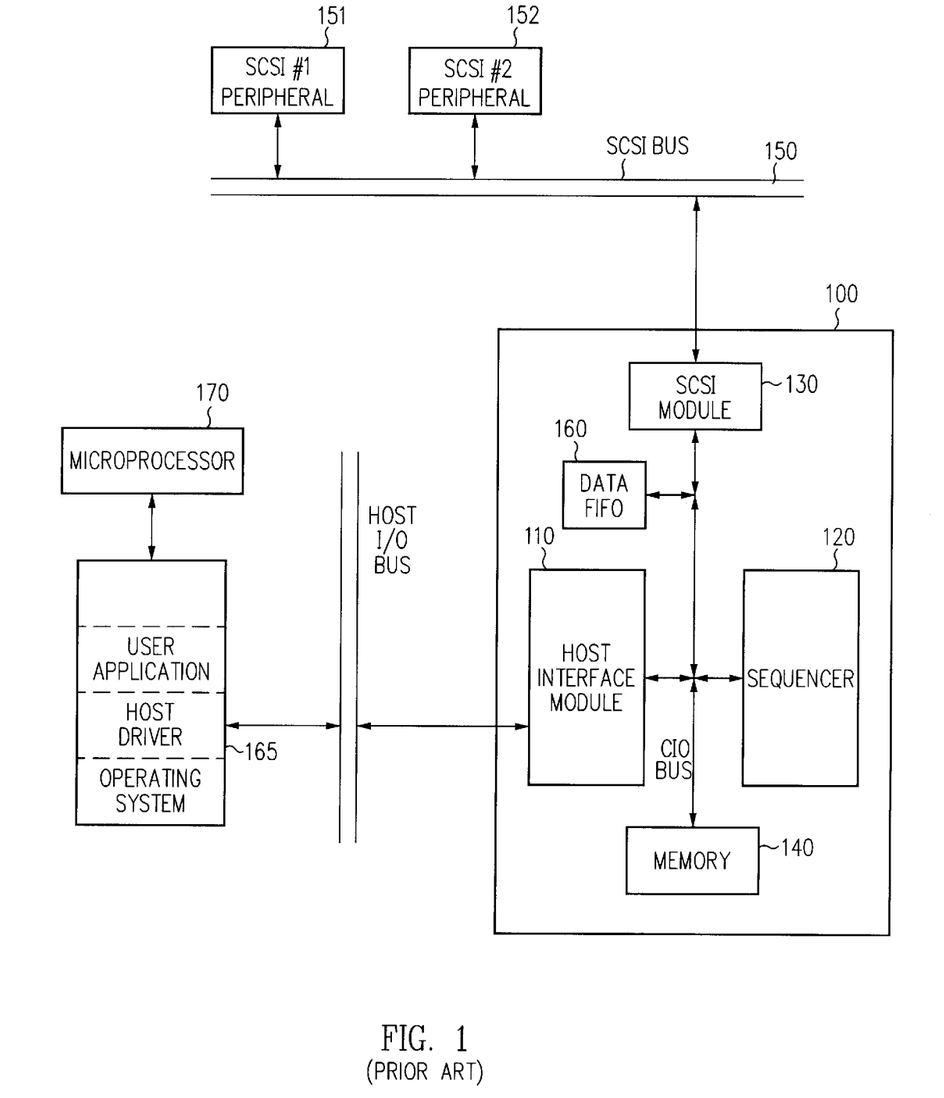
FIG. 1 is a block diagram of a prior art parallel SCSI host adapter integrated circuit.

As is known to those of skill in the art, an attention signal must be generated and maintained during portions of the SCSI protocol. In host adapter 100, sequencer 120 manually enabled generation of the attention signal, and manually determined when to de-assert the attention signal.

Specifically, sequencer 120 enabled a bit or bits that permitted SCSI module 130 to generate automatically the attention signal during the selection protocol. See for example, commonly assigned, U.S. Pat. No. 5,838,950, entitled "Method of Operation of a Host Adapter Integrated Circuit," issued on Nov. 17, 1998 to B. Arlen Young et al., which is incorporated herein by reference.

Sequencer 120 in determining when to de-assert the attention signal considered many factors. Specifically, sequencer 120 made the determination based on the type of sequencer control block (SCB), i.e., either a tagged queue SCB or a non-tagged queue SCB, the SCSI bus phase, and whether negotiation for a synchronous data transfer needed to be initiated. Typically, e.g., for a high-performance SCSI target device, sequencer 120 managed the attention signal while the target device was waiting for an active acknowledge signal ACK in response to an active request signal REQ generated by the target device.

For a non-tagged queue SCB, sequencer 120 de-asserted the attention signal just before generating an active acknowledge signal ACK for the identify message. For a tagged queue SCB, sequencer 120 kept the attention signal asserted until just before an active acknowledge signal was generated for the tag message. If synchronous negotiation was required, sequencer 120 left the attention signal asserted until host adapter driver 165 de-asserted the signal during negotiation, or until the command phase was entered in which case the time for negotiation had passed. While using sequencer 120 to manage de-assertion of the attention signal provided flexibility, the management requires sequencer time, which in turn limits the response of host adapter 100 to conditions on the SCSI bus.

SUMMARY OF THE INVENTION

According to the principles of this invention, operation of a system including a parallel SCSI host adapter integrated circuit is enhanced by automatic management of the SCSI bus attention signal by hardware within the parallel SCSI host adapter integrated circuit. Unlike the prior art host adapters that required a plurality of sequencer operations to manually manage the SCSI bus attention signal, automatic hardware management of the SCSI bus attention signal (i) provides faster execution, e.g., the active acknowledge signal can be generated more rapidly than with manual control, and (ii) permits a sequencer in the host adapter integrated circuit to perform other tasks in parallel with the hardware management of the SCSI bus attention signal. Both of these factors enhance the operation of the parallel SCSI host adapter integrated circuit of this invention relative to prior art parallel SCSI host adapters.

In a parallel SCSI host adapter integrated circuit, the hardware circuit of this invention includes a SCSI bus request terminal, a SCSI bus attention terminal, and an automatic SCSI bus attention management circuit. The automatic SCSI bus attention circuit includes an automatic SCSI bus attention assertion hardware circuit coupled to the SCSI bus attention terminal and an automatic SCSI bus attention de-assertion hardware circuit coupled to the SCSI bus attention terminal and to the SCSI bus request terminal.

Upon pending initiation of a selection phase, the automatic SCSI bus attention assertion circuit asserts an active signal on the SCSI bus attention terminal. Following assertion of the active signal on the SCSI bus attention terminal, the automatic SCSI bus attention de-assertion hardware circuit counts the number of active SCSI bus request signals received from the SCSI bus request terminal.

Upon the automatic SCSI bus attention management circuit receiving a terminal count of active request signals from the SCSI bus request terminal, the automatic SCSI bus attention hardware circuit de-asserts the active signal on the SCSI bus attention terminal.

In one embodiment, the automatic SCSI bus attention de-assertion circuit includes a programmable counter. The programmable counter includes an input terminal coupled to the SCSI bus request terminal. In response to an active signal on the SCSI bus request terminal, a count of the programmable counter is changed. Upon the programmable counter counting the terminal count of active signals on the SCSI bus request terminal, the programmable counter generates an attention de-assertion signal on an output terminal of the programmable counter. In another embodiment, the input terminal of the programmable counter is a decrement terminal and the programmable counter is a decrementing counter. In yet another embodiment, the input terminal of the programmable counter is an increment terminal and the programmable counter is an incrementing counter.

According to the principles of this invention, a method for automatic hardware management of a SCSI bus attention signal in a parallel SCSI host adapter integrated circuit includes asserting automatically a SCSI bus attention signal, using a hardware circuit, upon the SCSI bus entering a selection phase, and counting active request signals received from a target device on the SCSI bus after the asserting of the SCSI bus attention signal, using a counter in the hardware circuit. Finally, the method includes de-asserting automatically the SCSI bus attention signal using the hardware circuit upon counting a terminal count of the active request signals.

The method of this invention further includes bypassing the automatic assertion and de-assertion of the attention signal. The bypassing operations can be performed either by an on-chip sequencer, or a host adapter driver for the parallel SCSI host adapter integrated circuit of this invention.

With the circuit and method of this invention, only the firmware instruction sequence required to determine the terminal count value and to load that value in the programmable counter is needed. If the on-chip sequencer determines the terminal count, the sequencer does so in the background before the selection phase.

Alternatively, a host adapter driver can derive the terminal count and pass the terminal count to the sequencer in a SCB. With the exception of moving the terminal count from the SCB to the programmable counter, management of the attention signal can be completely removed from the sequencer firmware. In either of these cases, management of the attention signal has been totally removed from firmware paths executed when a target device is connected thereby reducing the delay between receiving an active request signal from a target device and generating the host adapter's active acknowledge signal.

BRIEF DESCRIPTION OF THE DRAWINGS

In the following description, elements with the same reference numeral are the same or equivalent elements.

DETAILED DESCRIPTION OF THE INVENTION

According to the principles of this invention, operation of a system including a parallel SCSI host adapter integrated circuit 200 (FIG. 2A) is enhanced by automatic management of the SCSI bus attention signal by hardware 235 within parallel SCSI host adapter integrated circuit 200. Unlike the prior art host adapters that required a plurality of sequencer operations to manually manage the SCSI bus attention signal, automatic hardware management of the SCSI bus attention signal provides faster execution, e.g., the active acknowledge signal can be generated more rapidly than with manual control, and permits a sequencer 220 to perform other tasks in parallel with the hardware management of the SCSI bus attention signal. Both of these factors enhance the operation of a parallel SCSI host adapter integrated circuit 200 relative to prior art parallel SCSI host adapters.

Figure 2A:
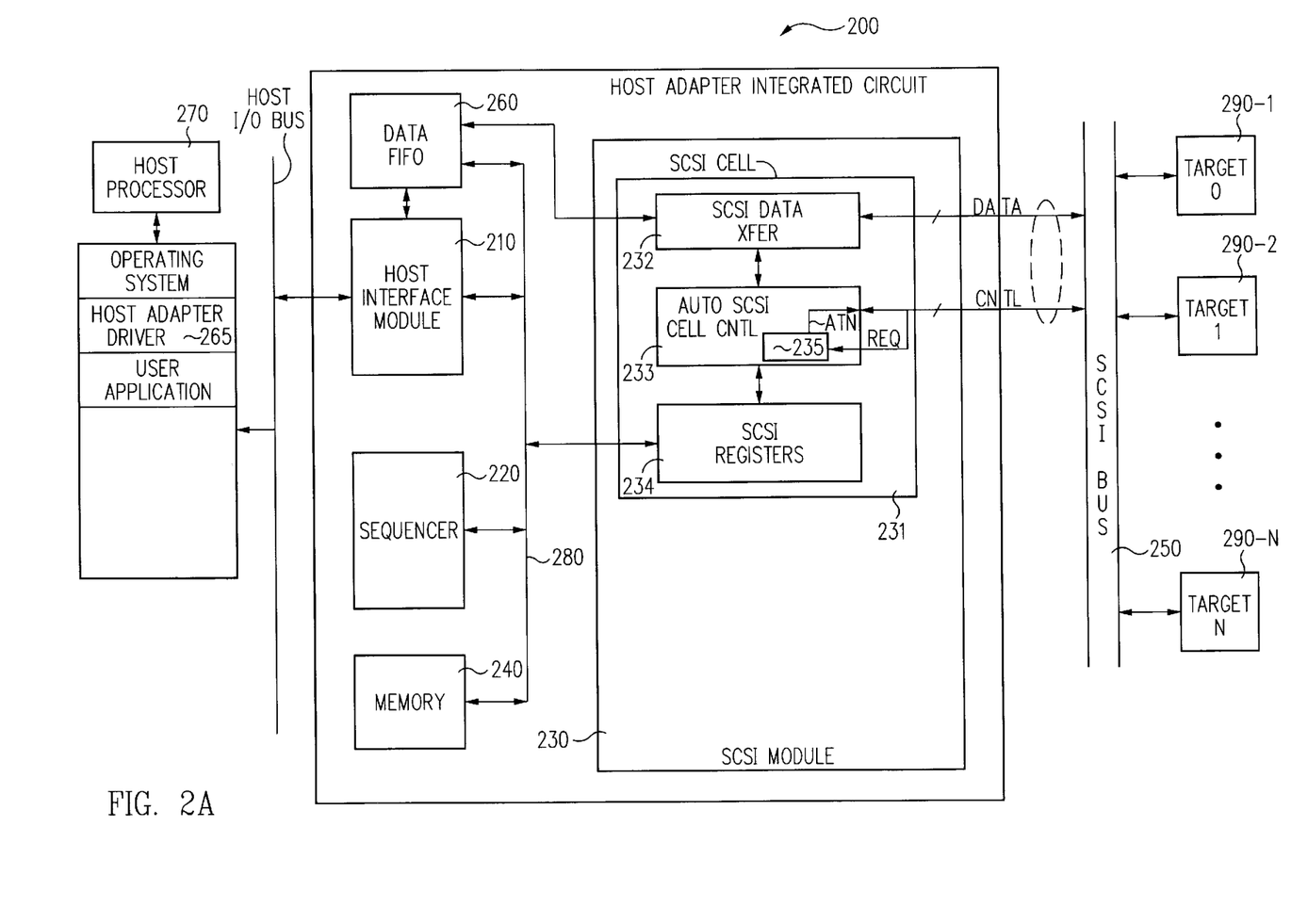
FIG. 2A is a block diagram of a parallel SCSI host adapter integrated circuit that includes a SCSI bus attention management hardware circuit, which automatically asserts and de-asserts a SCSI bus attention signal according to the principles of this invention.

A SCSI bus attention management circuit 235 is included within an automatic SCSI cell control block 233 that in turn is included within a SCSI cell 231 in a SCSI module 230 of parallel SCSI host adapter integrated circuit 200. Data and information are passed within host adapter integrated circuit 200 using an internal bus 280.

Parallel SCSI host adapter integrated circuit 200 also includes a data FIFO 260, a host interface module 210, and a memory 240. Each of these elements and internal bus 280are known to those of skill in the art, because they are similar to prior art elements, with the exceptions described herein. See for example commonly assigned U.S. Pat. No. 5,659,690, entitled "Programmably Configurable Host Adapter Integrated Circuit Including a RISC Processor," issued on Aug. 19, 1997 to Stuber et al., and commonly assigned U.S. Pat. No. 5,838,950, entitled "Method of Operation of a Host Adapter Integrated Circuit," issued on Nov. 17, 1998 to B. Arlen Young et al., each of which is incorporated herein by reference.

SCSI bus attention management circuit 235 is initialized with a terminal count by sequencer 220 for a particular message sequence over SCSI bus 250 using information passed to sequencer 220 via a sequencer control block (SCB) from host adapter driver 265. Alternatively, sequencer 220 may derive the terminal count in the background prior to the selection phase on SCSI bus 250. Following initialization, SCSI bus attention management circuit 235 automatically controls the state of the SCSI bus attention signal on attention line ATN within control lines CNTL of SCSI bus 250.

In this embodiment, an attention assertion circuit 236 (FIG. 2B) automatically drives an active signal on a terminal of host adapter integrated circuit 200 connected to attention line ATN within SCSI bus 250 upon successful completion of an arbitration, e.g., immediately prior to a selection phase on SCSI bus 250 when a selection phase is pending. Following the activation of the attention signal by attention circuit 236, an attention de-assertion circuit 237 within SCSI bus attention management circuit 235 monitors the number of active request signals REQ received from a target device on a request terminal of integrated circuit 200.

Figure 2B:
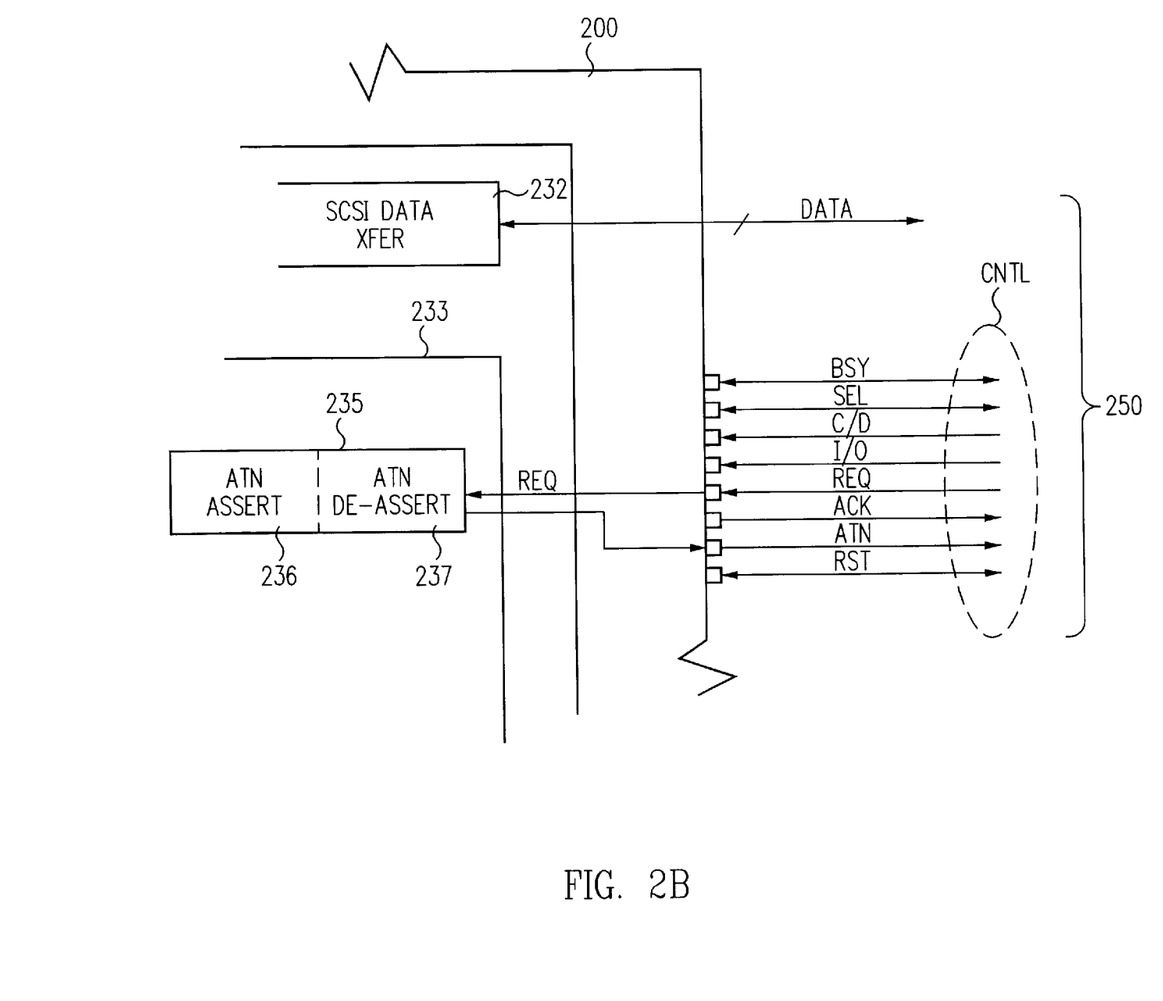
FIG. 2B is a more detail block diagram of the SCSI bus attention management hardware circuit of this invention.

In one embodiment, attention de-assertion circuit 237 counts the number of active request signals received following assertion of the active SCSI bus attention signal. When the count of active request signals REQ received is equal to a terminal count, attention de-assertion circuit 237 automatically de-asserts the attention signal, and an acknowledge signal ACK is driven active.

In one embodiment, the action of SCSI bus attention management circuit 235 may be over ridden, e.g., bypassed, by either sequencer 200, or other circuitry in SCSI cell 231 that generates an active attention signal. If sequencer 220 manually asserts the attention signal, the attention signal remains asserted until manually de-asserted by sequencer 220 independent of SCSI bus attention management circuit 235. For example, in one embodiment, an enable automatic attention bit must be set to enable the automatic operation of circuit 235, and so when automatic operation of circuit 235 is desired, this bit is set during initialization. If sequencer 220 or other circuitry wishes to take control of the attention signal for a particular operation, this bit is reset, and if appropriate set again upon completion of the particular operation.

Figure 3A:
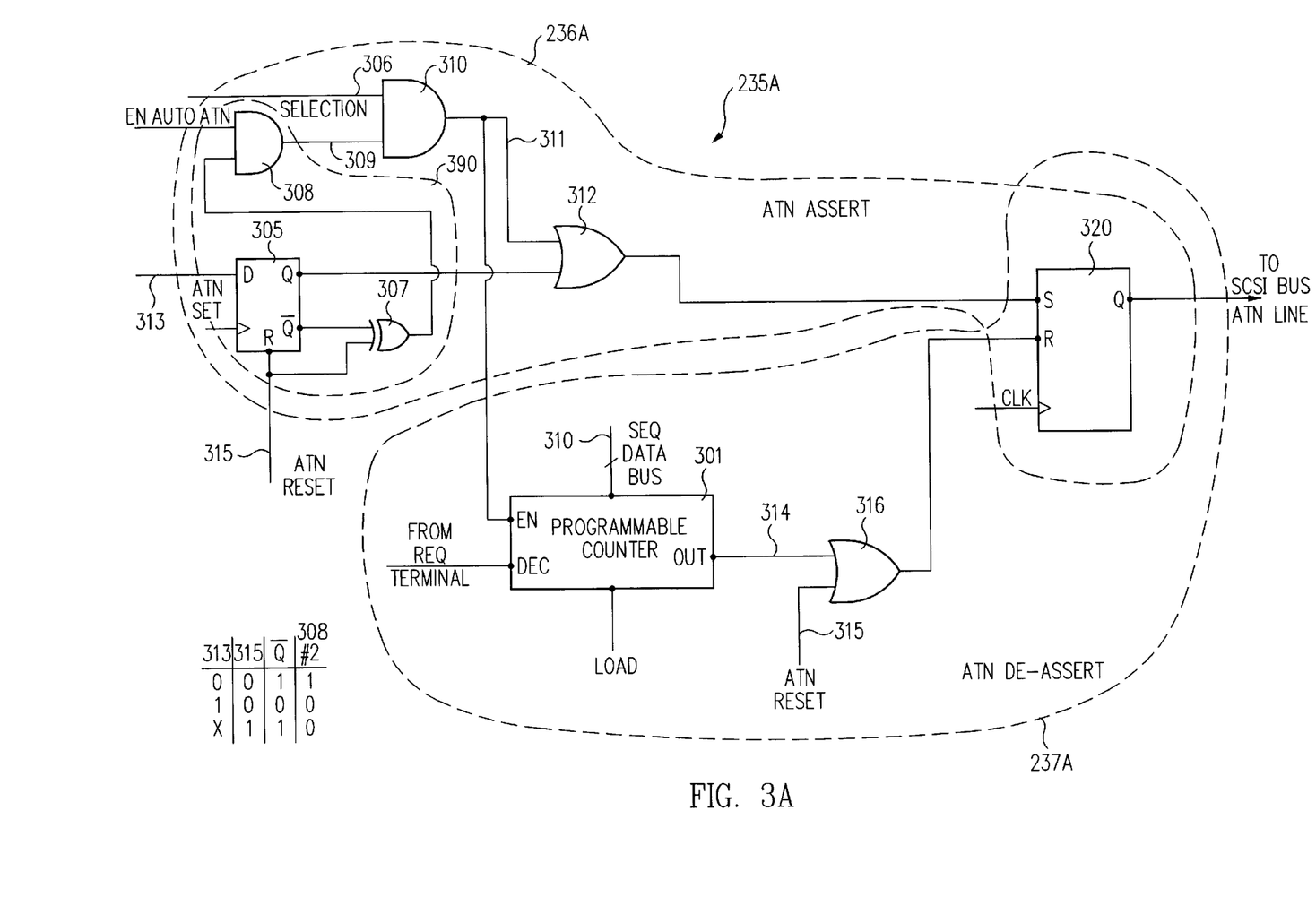
FIG. 3A is a schematic diagram of a first embodiment of the SCSI bus attention management hardware circuit of this invention.

In the embodiment of FIG. 3A, attention de-assertion circuit 237A within SCSI bus attention management circuit 235A includes a programmable counter 301. In initialization, sequencer 220 loads a terminal count in programmable counter 301 using at least a portion of sequencer data bus 310. In this embodiment, sequencer 220 places valid data on sequencer data bus 310 to programmable counter 301 and then drives an active signal on the load line, which causes the data on sequencer data bus 310 to be loaded into programmable counter 301.

As described, for example, in U.S. Pat. No. 5,838,950, entitled "Method of Operation of a Host Adapter Integrated circuit," issued on Nov. 17, 1998 to B. Arlen Young et al., which is incorporated herein by reference in its entirety, sequencer 220 also sets during initialization an appropriate enable automatic attention bit ENAUTOATNx (where x is I for an expected message in phase, and O for an expected message out phase) depending upon whether a message out phase or a message in phase follows the selection phase. Herein, enable automatic attention line ENAUTOATN is driven by the logical OR of the two automatic attention enable bits.

Enable automatic attention line ENAUTOATN is coupled to an automatic attention assertion bypass circuit 390 within attention assertion circuit 236A. Specifically, enable automatic attention line ENAUTOATN is connected to a first input terminal of an AND gate 308 in circuit 390. A second input terminal of AND gate 308 is connected to an output terminal of an exclusive OR gate 307 in circuit 390. A first input terminal of Exclusive OR gate 307 is connected to output terminal /Q of a D-type flip-flop 305 in circuit 390. A second input terminal of Exclusive OR gate 307 is connected to attention reset line 315 that is also connected to an asynchronous reset terminal R of flip-flop 305. Input terminal D of flip-flop 305 is connected to attention set line 313, which is an input line to circuit 390. Similarly, attention reset line 315 is another input line to circuit 390.

When sequencer 220, or other circuitry in host adapter 200 needs to set the signal on the SCSI bus attention line, an active signal is driven on line 313 and at all other times, the signal on line 313 is inactive. When sequencer 220, or other circuitry in host adapter 200 needs to reset the signal on the SCSI bus attention line, an active signal is driven on line 315 and at all other times, the signal on line 315 is inactive.

Thus, when circuit 235A automatically controls the signal level on the SCSI bus attention line, the signals on lines 313 and 315 are inactive. Consequently, the signal on output terminal Q of flip-flop 305 that is connected to a second input terminal of OR gate 312 is inactive, which in this embodiment is a logic low level. The signal on output terminal /Q is active.

Thus, exclusive OR gate 307 has an active input signal and an inactive input signal and so generates an active signal on the second input terminal of AND gate 308. Also, the signal on line ENAUTOATN is active, and so AND gate 308 drives an active signal on output line 309 to a second input terminal of AND gate 310.

When the signal on enable automatic attention line ENAUTOATN is active, automatic SCSI cell control block 233 generates a SCSI bus attention signal at the appropriate time during the selection phase. Specifically, circuitry within automatic SCSI cell control block 233 drives an active signal on selection line 306 to a first input terminal of AND gate 310 when a selection or reselection is anticipated, i.e., after a successful arbitration. The circuitry that drives selection line 306 is equivalent to that presented in U.S. Pat. No. 5,838,950, and also in U.S. Pat. No. 5,655,147, entitled "SCSI Host Adapter Integrated Circuit Utilizing A Sequencer Circuit to Control at Least One Non-Data SCSI Phase without Use of Any Processor," issued on August 5, 1997 to Craig A. Stuber and B. Arlen Young, both of which are incorporated herein by reference in their entirety.

When the signal on selection line 306 goes active, and the signal from AND gate 308 is active, AND gate 310 generates an active signal on output line 311 that is connected to a first input terminal of OR gate 312. A second input terminal of OR gate 312 is coupled to attention set line 313, as described above. Since automatic control of the attention signal is enabled in this example, manual control is not of interest and so the signal level on line 313 is inactive.

The active signal from AND gate 310 causes OR gate 312 to generate an active signal level on the set input terminal of set-reset register 320 that in turn drives an active signal on the SCSI bus attention line on the next clock edge on terminal CLK.

Note that if an active signal is applied on attention set line 313, the active signal is clocked through flip-flop 305 to output terminal Q. The active signal passes through OR gate 312 to set terminal S of set-reset flip-flop 320 that in turn drives the attention signal on SCSI bus 250 active as described above.

The signal on terminal /Q of flip-flop 305 is inactive as is the signal on line 315. Therefore, exclusive OR gate 307 generates an inactive output signal to AND gate 308 that in turn blocks the automatic assertion of the attention signal. When the signal on attention reset line goes active, flip-flop 305 is reset and so exclusive OR gate 307 receives two active input signals and so continues to generate an inactive output signal to AND gate 308. The reset of flip-flop 305 removes the active signal from terminal S of set-reset flip-flop 320, while the active signal on line 315 applies an active signal on terminal R of set-reset flip-flop 320 which in turn resets the active signal on the SCSI attention line in SCSI bus 250. Automatic assertion of the attention signal is effectively by-passed until both the signals on lines 313 and 315 are inactive. If there are active signals on both input terminals S and R of flip-flop 320, the reset function controls the signal level on output terminal Q.

The logic gates and register used in FIG. 3A are illustrative only and are not intended to limit the invention to the specific circuit illustrated. In view of this disclosure, those of skill in the art can implement the SCSI automatic attention management circuit in a variety of configurations. The important aspect is that following initialization by sequencer 220, the hardware circuitry automatically controls assertion and de-assertion of the SCSI bus attention signal.

Following initialization, programmable counter 301 remains idle until a selection phase on SCSI bus 250. As described above, when a selection phase is anticipated, the input signals to AND gate 310 cause the gate to generate an active signal on its output terminal, which is connected to an enable terminal EN of programmable counter 301. Thus, programmable counter 301 is enabled upon entry of the selection phase.

When counter 301 is enabled, the value in programmable counter 301 is decremented in response to each active request signal REQ received from a target device over SCSI bus 250. Specifically, a signal driven active by the active request signal is driven on terminal DEC of programmable counter 301, which in turn decrements the counter.

When programmable counter 301 reaches a zero value, i.e., the terminal count of active request signals has been generated by a target device, programmable counter 301 drives an active signal on output terminal OUT. Output terminal OUT is connected to a first input terminal of OR gate 316 by line 314. A second input terminal of OR gate 316 is connected to an attention reset line 315.

As noted above, since automatic control of the attention signal is enabled in this example, manual control is not of interest and so the signal level on 5line 315 is inactive. Thus, the active signal from output terminal OUT of programmable counter 301 is passed through OR gate 316 to a reset terminal of set-reset register 320. In response to the active signal on the reset terminal, set-reset register 320 drives an inactive signal on the SCSI bus attention line on the next clock edge on terminal CLK.

Hence, following initialization, SCSI bus attention management circuit 235A (FIG. 3A) automatically asserts and de-asserts the signal on the SCSI bus attention line without intervention of any processor, e.g., without intervention of either sequencer 220 or host processor 270 via host adapter driver 265. Consequently, both processors can be performing other functions in parallel with the management of the SCSI bus attention signal by circuit 235A. The SCSI bus attention management hardware circuit of this invention improves performance over the prior art configurations that required manual control of the SCSI bus attention signal following assertion of that signal.

However, sequencer 220, host processor 270, or other circuitry in host adapter 200 can still manually control the SCSI bus attention signal by driving an active signal on attention set line 313, which disables the automatic circuitry, and drives an active signal on the SCSI bus attention line. To reset the attention signal, the active signal on line 313 is de-asserted, and an active signal is driven on manual reset line 315.

Figure 3B:
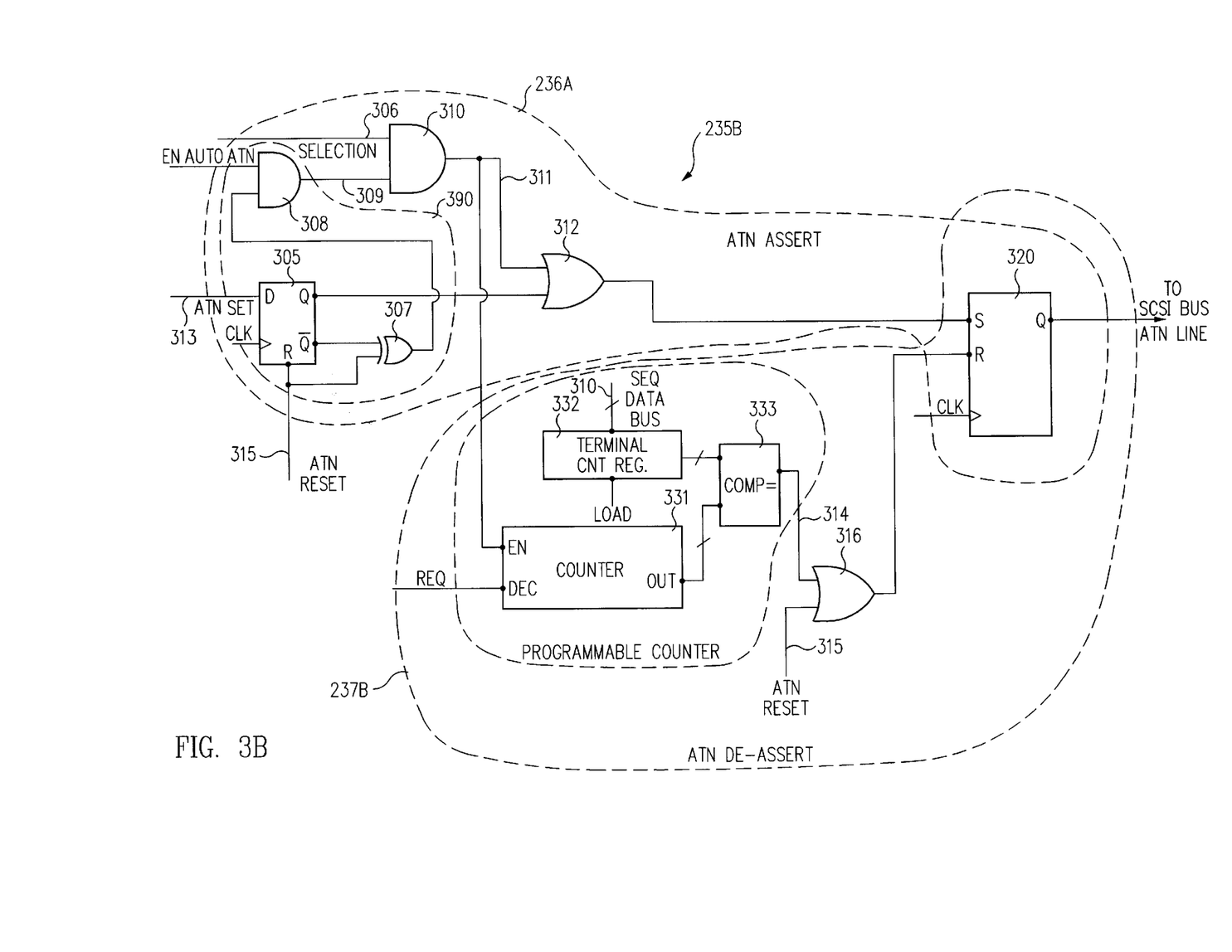
FIG. 3B is a schematic diagram of a second embodiment of the SCSI bus attention management hardware circuit of this invention.

The embodiment of this invention illustrated in FIG. 3A utilized a decrementing programmable counter. Alternatively, an incrementing counter 331 is used in SCSI bus attention management circuit 235B, as illustrated in FIG. 3B. In this embodiment, sequencer 220 loads the terminal count in a terminal counter register 332 using at least a portion of sequencer data bus 310 and line LOAD in a manner equivalent to that described for loading programmable counter 301.

The terminal count in terminal count register 331 is a first input value to a comparator 333. A second input value to comparator 333 is from the output terminals of incrementing counter 331. An output terminal of comparator 333 is connected to line 314. Those of skill in the art will appreciate that elements 331, 332, and 333 are simply an alternative embodiment of a programmable counter.

The operation of circuit 335B for automatically asserting the SCSI bus attention signal is the same as that described above. In this embodiment, the active output signal from AND gate 310 drives an enable terminal EN of counter 331. Thus, counter 331 is enabled upon entry of the selection phase.

When counter 331 is enabled, the value in counter 331 is incremented in response to each active signal on input terminal INC. The signal on input terminal INC is driven active in response to each active request signal REQ received from a target device over SCSI bus 250.

The value of counter 331 is provided to comparator 333. When counter 331 reaches a value equal to the terminal count stored in register 332, comparator 333 drives an active signal on output terminal OUT. In response the active output signal from comparator 333, set-reset register 320 drives the signal on the SCSI bus attention line inactive.

The terminal count loaded by sequencer 220 into circuit 235 depends upon the specific message sequence. Table 1 presents terminal counts for message out sequences.

| Terminal Count | SCB | Sync Negotiation | Sequence |
|---|---|---|---|
| 1 | Non-tagged Queue | No | Identify |
| 6 | Non-tagged Queue | Yes | Identify and five bytes of Extended Message |

-continued

| Terminal Count | SCB | Sync Negotiation | Sequence |
|---|---|---|---|
| 3 | Tagged Queue | No | Identify, Tagged Queue, Tag |
| 8 | Tagged Queue | Yes | Identify, Tagged Queue, Tag, and five bytes of Extended Message |

The above embodiments of the invention are illustrative only of the principles of this invention are not intended to limit the invention to the particular examples presented. In particular, the principles of this invention can be used in a variety of parallel SCSI host adapters. In view of this disclosure, those of skill in the art can incorporate a hardware programmable counter and logic associated with interfacing the counter with the existing circuitry in a parallel SCSI host adapter integrated circuit.

The firmware instruction sequence required to determine the terminal count value and to load that value in the programmable counter must also be included. If sequencer 220 determines the terminal count, sequencer 220 does so in the background prior to the selection phase.

Alternatively, host adapter driver 265 can derive the terminal count and pass the terminal count to sequencer 220 in the SCB. With the exception of moving the terminal count from a SCB to the programmable counter, management of the attention signal can be completely removed from the sequencer firmware. In either of this cases, management of the attention signal has been totally removed from firmware paths executed when a target device is connected thereby reducing the delay between receiving an active request signal from a target device and generating the host adapter's active acknowledge signal.

I claim:

1. In a parallel SCSI host adapter integrated circuit, a hardware circuit comprising:
   a SCSI bus request terminal;
   a SCSI bus attention terminal; and
   an automatic SCSI bus attention management circuit comprising:
      an automatic SCSI bus attention assertion hardware circuit coupled to the SCSI bus attention terminal, wherein upon pending initiation of a selection phase, the automatic SCSI bus attention assertion hardware circuit asserts an active signal on the SCSI bus attention terminal; and
      an automatic SCSI bus attention de-assertion hardware circuit coupled to the SCSI bus attention terminal and to the SCSI bus request terminal, wherein following assertion of the active signal on the SCSI bus attention terminal, the automatic SCSI bus attention de-assertion hardware circuit counts the number of active SCSI bus request signals received from the SCSI bus request terminal, and upon receiving a terminal count of active request signals from the SCSI bus request terminal, the automatic SCSI bus attention hardware circuit de-asserts the active signal on the SCSI bus attention terminal.

2. The hardware circuit of claim 1 wherein the automatic SCSI bus attention de-assertion hardware circuit further comprises:
   a programmable counter having an input terminal coupled to the SCSI bus request terminal, and an output terminal, wherein in response to an active signal on the SCSI bus request terminal, a count of the programmable counter is changed, and further wherein upon the programmable counter counting the terminal count of active signals on the SCSI bus request terminal, the programmable counter generates an attention de-assertion signal on the output terminal of the programmable counter.

3. The hardware circuit of claim 2 wherein the input terminal of the programmable counter is a decrement terminal and the programmable counter is a decrementing counter.

4. The hardware circuit of claim 2 wherein the input terminal of the programmable counter is an increment terminal and the programmable counter is an incrementing counter.

5. The hardware circuit of claim 1 further comprising:
an enable automatic attention input line coupled to said automatic SCSI bus attention assertion hardware circuit wherein an active signal is driven on said enable automatic attention input line by hardware within said parallel SCSI host adapter integrated circuit upon a sequencer enabling automatic assertion of said active signal on the SCSI bus attention terminal.

6. The hardware circuit of claim 1 further comprising:
a selection input line coupled to said automatic SCSI bus attention assertion hardware circuit wherein an active signal is driven on said selection input line by hardware within said parallel SCSI host adapter integrated circuit upon completion of a successful arbitration.

7. The hardware circuit of claim 5 further comprising:
a selection input line coupled to the automatic SCSI bus attention assertion hardware circuit wherein an active signal is driven on said selection input line by hardware within said parallel SCSI host adapter integrated circuit upon completion of a successful arbitration.

8. The hardware circuit of claim 7 wherein said automatic SCSI bus attention assertion hardware circuit asserts said active signal on the SCSI bus attention terminal in response to said active signal on said selection input line and said active signal on said enable automatic attention input line.

9. The hardware circuit of claim 5 further comprising:
an automatic attention assertion bypass circuit coupled to said SCSI bus attention terminal, and connected to said enable automatic attention input line.

10. The hardware circuit of claim 9 further comprising:
an attention set input line connected to said automatic attention assertion bypass circuit.

11. The hardware circuit of claim 9 further comprising:
an attention reset input line connected to said automatic attention assertion bypass circuit.

12. The hardware circuit of claim 10 further comprising:
an attention reset input line connected to said automatic attention assertion bypass circuit.

13. In a parallel SCSI host adapter integrated circuit, a hardware circuit comprising:
a SCSI bus request terminal;
a SCSI bus attention terminal;
an enable automatic attention input line wherein an active signal is driven on said enable automatic attention input line by hardware within said parallel SCSI host adapter integrated circuit upon a sequencer enabling automatic assertion of an active signal on the SCSI bus attention terminal;
a selection input line wherein an active signal is driven on said selection input line by hardware within said parallel SCSI host adapter integrated circuit upon completion of a successful arbitration;
an attention set input line;
an attention reset input line;
an automatic SCSI bus attention management circuit coupled to said enable automatic attention input line and to said selection input line, said automatic SCSI bus attention management circuit comprising:
an automatic SCSI bus attention assertion hardware circuit coupled to the SCSI bus attention terminal, wherein upon pending initiation of a selection phase, the automatic SCSI bus attention assertion hardware circuit asserts the active signal on the SCSI bus attention terminal; and
an automatic SCSI bus attention de-sssertion assertion hardware circuit coupled to the SCSI bus attention terminal and to the SCSI bus request terminal, wherein following assertion of the active signal on the SCSI bus attention terminal, the automatic SCSI bus attention de-assertion hardware circuit counts the number of active SCSI bus request signals received from the SCSI bus request terminal, and upon receiving a terminal count of active request signals from the SCSI bus request terminal, the automatic SCSI bus attention hardware circuit de-asserts the active signal on the SCSI bus attention terminal; and
an automatic attention assertion bypass circuit connected to said enable automatic attention input line, to said attention reset input line, to said attention set input line, and coupled to said SCSI bus attention terminal.

14. The hardware circuit of claim 13 wherein the automatic SCSI bus attention de-assertion hardware circuit further comprises:
a programmable counter having an input terminal coupled to the SCSI bus request terminal, and an output terminal, wherein in response to an active signal on the SCSI bus request terminal, a count of the programmable counter is changed, and further wherein upon the programmable counter counting the terminal count of active signals on the SCSI bus request terminal, the programmable counter generates an attention de-assertion signal on the output terminal of the programmable counter.

15. The hardware circuit of claim 14 wherein the input terminal of the programmable counter is a decrement terminal and the programmable counter is a decrementing counter.

16. The hardware circuit of claim 14 wherein the input terminal of the programmable counter is an increment terminal and the programmable counter is an incrementing counter.

17. A method for automatic hardware management of a SCSI bus attention signal in a parallel SCSI host adapter integrated circuit, the method comprising:
asserting automatically a SCSI bus attention signal by a hardware circuit upon a selection phase pending on the SCSI bus;
counting active request signals received from a target device on the SCSI bus by the hardware circuit after the asserting automatically the SCSI bus attention signal by the hardware circuit; and
de-asserting automatically the SCSI bus attention signal by the hardware circuit upon counting a terminal count of the active request signals.

18. The method of claim 17 further comprising:
bypassing said asserting automatically a SCSI bus attention signal.

19. The method of claim 17 further comprising:
bypassing said de-asserting automatically the SCSI bus attention signal.

20. The method of claim 18 further comprising:
bypassing said de-asserting automatically the SCSI bus attention signal.

* * * * *